(12) United States Patent
Ravishankar et al.

(10) Patent No.: US 9,901,910 B2
(45) Date of Patent: *Feb. 27, 2018

(54) CATALYST COMPOSITE FOR THE REDUCTION OF OLEFINS IN THE FCC NAPHTHA STREAM

(71) Applicant: HINDUSTAN PETROLEUM CORPORATION LIMITED, Mumbai (IN)

(72) Inventors: Raman Ravishankar, Bengaluru (IN); Sunil Mehla, Bengaluru (IN); Peddy Venkata Chalapathi Rao, Bengaluru (IN); Nettem Venkateswarlu Choudary, Bengaluru (IN); Sriganesh Gandham, Bengaluru (IN)

(73) Assignee: Hindustan Petroleum Corporation Limited, Mumbai, Maharashtra (IN)

( * ) Notice: Subject to any disclaimer, the term of this patent is extended or adjusted under 35 U.S.C. 154(b) by 328 days.

This patent is subject to a terminal disclaimer.

(21) Appl. No.: 14/670,868

(22) Filed: Mar. 27, 2015

(65) Prior Publication Data

US 2015/0273448 A1  Oct. 1, 2015

(30) Foreign Application Priority Data

Mar. 31, 2014 (IN) .......... 1234/MUM/2014

(51) Int. Cl.
| | |
|---|---|
| *B01J 23/10* | (2006.01) |
| *C10G 35/095* | (2006.01) |
| *B01J 29/40* | (2006.01) |
| *B01J 37/02* | (2006.01) |
| *B01J 37/04* | (2006.01) |
| *B01J 29/06* | (2006.01) |
| *B01J 37/00* | (2006.01) |
| *C10G 35/06* | (2006.01) |
| *C10G 50/00* | (2006.01) |
| *C10G 55/06* | (2006.01) |
| *C10G 63/04* | (2006.01) |
| *C10G 69/12* | (2006.01) |
| *C10G 45/00* | (2006.01) |
| *B01J 35/02* | (2006.01) |

(52) U.S. Cl.
CPC ............. *B01J 29/405* (2013.01); *B01J 23/10* (2013.01); *B01J 29/061* (2013.01); *B01J 37/0009* (2013.01); *B01J 37/0201* (2013.01); *B01J 37/04* (2013.01); *C10G 35/065* (2013.01); *C10G 35/095* (2013.01); *C10G 45/00* (2013.01); *C10G 50/00* (2013.01); *C10G 55/06* (2013.01); *C10G 63/04* (2013.01); *C10G 69/123* (2013.01); *B01J 35/026* (2013.01); *B01J 2229/186* (2013.01); *B01J 2229/20* (2013.01); *B01J 2229/42* (2013.01); *C10G 2300/1044* (2013.01); *C10G 2300/1088* (2013.01); *C10G 2400/02* (2013.01)

(58) Field of Classification Search
None
See application file for complete search history.

(56) References Cited

U.S. PATENT DOCUMENTS

| | | | |
|---|---|---|---|
| 2008/0161621 A1* | 7/2008 | Riley | ............... C07C 2/66 585/468 |
| 2008/0293561 A1* | 11/2008 | Long | ............... B01J 29/06 502/65 |
| 2010/0249479 A1* | 9/2010 | Berg-Slot | ............... B01J 23/626 585/489 |
| 2010/0326888 A1* | 12/2010 | Xu | ............... B01J 29/06 208/120.01 |
| 2014/0080697 A1* | 3/2014 | Long | ............... B01J 29/0308 502/65 |
| 2015/0209767 A1* | 7/2015 | Gao | ............... C01B 39/24 423/701 |
| 2017/0203285 A1* | 7/2017 | van Broekhoven | ... B01J 29/068 |

* cited by examiner

*Primary Examiner* — Tam M Nguyen
(74) *Attorney, Agent, or Firm* — Sand & Sebolt

(57) ABSTRACT

The present disclosure relates to a catalyst composition comprising (a) at least one rare earth metal, (b) at least one zeolite, and (c) at least one diluent, wherein, said rare earth metal is impregnated in at least one of (b) and (c); the ratio of said zeolite to said diluent ranges from 1:9 to 9:1; and the amount of said rare earth metal is in the range of 0.1 to 20 w/w %. The present disclosure also relates to a process for preparing a catalyst composition. Further, the present disclosure relates to a process for reducing the olefin content in a hydrocarbon stream using the catalyst of the present disclosure.

9 Claims, No Drawings

CATALYST COMPOSITE FOR THE REDUCTION OF OLEFINS IN THE FCC NAPHTHA STREAM

FIELD OF THE DISCLOSURE

The present disclosure is directed to a catalyst composition and a process for preparing the same. The present disclosure is also directed to a process for reducing the olefin content in a hydrocarbon stream by using the catalyst composition.

BACKGROUND

Petroleum refiners produce desirable product/s by hydrocracking a hydrocarbon feedstock. Hydrocracking is accomplished by contacting the hydrocarbon feedstock, hydrogen and a hydrocracking catalyst at an elevated temperature and pressure to obtain a desired product/s. Most of today's hydrocracking processes are based on zeolite catalysts. The zeolite catalysts used for hydrocracking consists of two components namely, hydrogenation component and acid component. The hydrogenation component consists of Group VIII noble metals optionally in a combination with Group VIII and/or Group VIB metals, whereas the acid component consists of zeolites, amorphous silica-alumina gel, transition alumina or aluminosilicate. The acid component of the zeolite catalyst provides a support to the hydrogenation components and acts as a cracking catalyst. Such zeolites, to be useful for hydrocracking the hydrocarbon feedstock, should remain active and stable for a longer duration to completely convert the feed stock into the desired product/s.

However, currently available catalysts though stable and selective are not active enough to completely convert the olefins into higher octane components such as isoparaffins, naphthenes or aromatics. These unconverted olefins remain in the final product and adversely affect the quality and the functioning of the final product. For instance, the unconverted olefins present in the gasoline are detrimental to the engine of a vehicle as they form a sticky gum.

Further, the unconverted olefins in the gasoline also contribute to the environmental pollution.

Therefore, there is felt a need for a catalyst composition that is capable of reducing the olefin content in the hydrocarbon stream into the desired products which are substantially free of olefins.

OBJECTS

Some of the objects of the present disclosure, which at least one embodiment herein satisfies, are as follows:

It is an object of the present disclosure to provide a catalyst composition.

It is another object of the present disclosure to provide a catalyst composition which is useful for conversion of olefins into the desired products.

It is still another object of the present disclosure to provide a catalyst composition which is amenable to large scale.

It is still another object of the present disclosure to provide a simple process for preparing a catalyst composition.

It is still another object of the present disclosure to provide a simple process for converting olefins into the desired products which employs a catalyst composition.

Other objects and advantages of the present disclosure will be more apparent from the following description which is not intended to limit the scope of the present disclosure.

SUMMARY

In accordance with one aspect of the present disclosure there is provided a catalyst composition comprising:
   a. at least one rare earth metal,
   b. at least one zeolite, and
   c. at least one diluent,
   wherein, the ratio of said zeolite to said diluent ranges from 1:9 to 9:1; and
   the amount of said rare earth metal is in the range of 0.1 to 20 w/w %.

The rare earth metal can be impregnated in said zeolite.
The rare earth metal can be incorporated in said diluent.
The rare earth metal can be impregnated in said zeolite and incorporated in said diluent Typically, the ratio of $SiO_2$ to $Al_2O_3$ in said zeolite ranges from 1:20 to 1:450.

In accordance with another aspect of the present invention there is provided a process for preparing the catalyst composition, said process comprising the following steps:
   i. mixing at least one zeolite and at least one diluent in the presence of an aqueous solution of at least one mineral acid to obtain slurry,
   ii. calcining the slurry to obtain a calcined mixture,
   iii. impregnating at least one rare earth metal in the calcined mixture in the presence of an aqueous solution of at least one metal salt to obtain metal impregnated mixture,
   iv. removing the aqueous medium to obtain a dried mass, and
   v. calcining the dried mass to obtain the catalyst composition having the ratio of said zeolite to said diluent in the range of 1:9 to 9:1, preferably 1:1 to 7:3; and the amount of said rare earth metal in said catalyst composition in the range of 0.1 to 20 w/w %.

The process step of mixing (i) comprises pre-steps of;
   i. impregnating at least one rare earth metal in at least one component selected from the group consisting of at least one zeolite and at least one diluent in the presence of an aqueous solution of at least one mineral acid to obtain at least one metal impregnated component, and
   ii. calcining said metal impregnated component, said process optionally comprises process steps of (ii) and (iii).

The method steps (i) and (iv) further comprises a method step of extruding the slurry and the dried mass respectively.

Typically, the ratio of $SiO_2$ to $Al_2O_3$ in said zeolite ranges from 1:20 to 1:450.

In accordance with yet another aspect of the present disclosure there is provided a process for reducing the olefin content in a hydrocarbon stream, said process comprising the following steps;
   i. providing at least one hydrocarbon stream comprising olefins in an amount ranging from 0.01 to 70 w/w %, and
   ii. contacting said hydrocarbon stream with the catalyst composition, at a temperature of 350 to 450° C. and at a pressure of 1 bar to 20 bars in the presence of at least one carrier gas to obtain the hydrocarbon stream comprising at least 40 w/w % reduced olefin content.

The method step of contacting is carried out in a fixed bed reactor at a flow rate of said hydrocarbon stream ranging from 10 to 14 ml/h and the space velocity ranging from 8 to 10 WHSV (weight hourly space velocity).

DETAILED DESCRIPTION

The olefin content in hydrocarbons, such as gasoline, is detrimental to engines as high amount of sticky material is formed after combustion. The presence of olefins also leads to the emission of pollutants in high amount which violates environmental norms. Therefore, there is a need for a catalyst that is amenable at large scale and simultaneously satisfactorily reduces the amount of olefin to a desired limit.

Accordingly, the inventors of the present disclosure provide a catalyst composition that is capable of reducing the amount of olefin present in a hydrocarbon. The catalyst composition described herein comprises at least one diluent, at least one zeolite and at least one rare earth metal. The rare earth metal is impregnated in the diluent or incorporated in the zeolite or both. The performance or the activity of the composition depends on the specific proportion of the individual components of the composition with respect to each other. Therefore, it will be prudent to mention the proportion of individual components with respect to each other. Accordingly, the ratio of the zeolite to the diluent ranges from about 1:9 to about 9:1. The catalyst having the ratio of the zeolite to the diluent in the range of 1:1 to 7:3 was observed to provide efficient olefin reduction. Further, the ratio of silicon dioxide (SiO2) to aluminium oxide (Al2O3) is in the range of about 1:20 to about 1:450.

The content of rare earth metal in the composition is dependent on various parameters which may include content of the olefins in the hydrocarbon stream, conversion of olefins into desired product/s and the like. Accordingly, the content of rare earth metal in the composition is varied from about 0.1 w/w % to about 20 w/w %. The rare earth metal useful for the purpose of the present invention is at least one selected from the group consisting of scandium, yttrium, lanthanum, praseodymium, neodymium, promethium, samarium, europium, gadolinium, terbium, dysprosium, holmium, erbium, thulium, ytterbium and lutetium. Alternatively, the rare earth metal is in a salt form wherein the anionic part is selected from the group consisting of chloride, bromide, fluoride, iodide, sulfates, phosphates, phosphonates, nitrates, nitrites, carbonates, acetates, bicarbonates, hydroxides and oxides.

The zeolite on which the catalyst composition of the present invention is based is at least one selected from the group consisting of ZSM-5, ZSM-11, ZSM-48, ZSM-12, ZSM-22, ZSM-23, ZSM-57, SAPO-5, SAPO-11, SAPO-17, SAPO-18, SAPO-34, SAPO-44, ferrierite, mordenite, beta, and zeolite Y. The choice of the zeolite in the catalyst composition depends on the type and contents of hydrocarbon stream which is to be subjected for the conversion of olefins into desired product/s.

Further, the catalyst of the present disclosure may be provided in any form selected from the group consisting of extrudate, spherical, pellet, lobe, ring, granule and powder depending upon the requirement.

The diluent used in the composition possesses at least one property of high crystallinity, excellent gelling capability and strong peptization. These properties are imparted to the composition in which the diluent is used. Depending on the desired properties of the composition, the type and amount of the diluent is selected. The diluent useful for the purpose is selected from the group consisting of pseudoboehmite, alpha-alumina, gamma-alumina, kaolin, theta-alumina and eta-alumina and clay materials such as kaolinite, montmorillonite and amberlite. After several experiments the inventors found that the pseudoboehmite is the most suitable diluent as the performance of the catalyst composition and the amenability of the catalyst at large scale is greatly enhanced in its presence.

The catalyst composition described herein is prepared by a simple process. In the process, at least one zeolite and at least one diluent are mixed in the presence of an aqueous solution containing mineral acid such as nitric acid in the desired/predetermined proportions and stirred at a temperature of about 20° C. to 40° C. to obtain thick slurry. The slurry is calcined at a temperature ranging from 500 to 800° C. to obtain a calcined mixture. The slurry may optionally be extrudated before calcination. To the calcined mixture at least one rare earth metal is impregnated in the presence of an aqueous solution of at least one rare earth metal salt to obtain a metal impregnated mixture.

The term mixture(s) or synonyms thereof in the context of the present invention would mean physical mixtures, admixtures or intergrowths of the components therein.

From the metal impregnated mixture, the aqueous medium is removed to obtain a dried mass followed by calcination, at a temperature ranging from 500 to 800° C. to obtain the catalyst composition of the present disclosure. The dried mass may optionally be extruded before calcination.

Alternatively, at least one rare earth metal is impregnated in at least one zeolite in the presence of an aqueous solution of at least one mineral acid such as nitric acid to obtain at least one metal impregnated zeolite. The metal impregnated zeolite is then calcined at a temperature ranging from 500 to 800° C., optionally after extruding to obtain a calcined metal impregnated zeolite. The calcined metal impregnated zeolite is mixed with at least one diluent in the presence of an aqueous solution of at least one mineral acid such as nitric acid to obtain slurry. The aqueous medium is removed by a technique known to a person skilled in the art to obtain a dried mass which is then calcined at a temperature ranging from 500 to 800° C. to obtain the catalyst composition of the present disclosure.

Still alternatively, at least one rare earth metal is impregnated in at least one diluent in the presence of an aqueous solution of at least one mineral acid such as nitric acid to obtain at least one metal impregnated diluent. The metal impregnated diluent is then calcined at a temperature ranging from 500 to 800° C., optionally after extruding to obtain calcined metal impregnated diluent. The calcined metal impregnated diluent is mixed with at least one zeolite in the presence of an aqueous solution of at least one mineral acid such as nitric acid to obtain slurry. The aqueous medium is removed by a technique known to a person skilled in the art to obtain a dried mass which is then calcined at a temperature ranging from 500 to 800° C. to obtain the catalyst composition of the present disclosure.

Still alternatively, at least one rare earth metal is impregnated, separately in at least one diluent and at least one zeolite in the presence of an aqueous solution of at least one mineral acid such as nitric acid to obtain a metal impregnated zeolite and a metal impregnated diluent. The aqueous medium from the metal impregnated zeolite and the metal impregnated diluent is removed by a technique known to a person skilled in the art to obtain dried masses. The dried masses are calcined, individually at a temperature ranging from 500 to 800° C., optionally after extruding to obtain a calcined metal impregnated zeolite and a calcined metal impregnated diluent. The calcined metal impregnated zeolite and the calcined metal impregnated diluent are mixed in the pre-determined quantities to obtain the catalyst composition of the present disclosure.

The reduction of olefin content in the hydrocarbon stream can be performed by employing the catalyst composition of the present disclosure under reaction conditions including a temperature of from about 350° C. to about 450° C., a pressure of from about 1 bar to about 20 bars, and a space velocity of from about 1 WHSV to about 50 WHSV in the presence of a carrier gas. In the process, at least one hydrocarbon stream is provided which is then contacted with the catalyst composition of the present invention at the above mentioned temperature and pressure conditions to obtain the hydrocarbon stream comprising reduced olefin content. The hydrocarbon stream and the catalyst are contacted in a fixed bed reactor at a flow rate of said hydrocarbon stream ranging from 10 to 14 ml/h at a space velocity ranging from 8 to 10 WHSV.

The hydrocarbon stream may contain olefins in the range of 0.01 to 70 w/w % and is selected from the group consisting of gasoline, vacuum gas oil (VGO), light cycle oil (LCO), naphtha and $C_4$ to $C_{12}$ olefins.

The carrier gas employed during the process of reducing the olefin contents of the hydrocarbon stream is selected from the group consisting of nitrogen, hydrogen or combination thereof.

The present disclosure is further described in light of the following non-limiting examples which are set forth for illustration purpose only and are not to be construed for limiting the scope of the disclosure.

The process for preparing the composition of the present invention is illustrated in Example 1 given below. Example 2 illustrates the use of the composition as a catalyst in the conversion of olefins.

EXAMPLE 1

General Method for the Preparation of the Composition of the Present Disclosure

Desired amount of ZSM-5 was mixed with diluent and 0.5 M solution of rare earth metal salt in varying proportion to obtain slurry. The diluent or zeolite may additionally comprise rare earth metal salt loading. The slurry was stirred at 25° C. for 3 hours to obtain thick slurry. The thick slurry was evaporated in a rotary evaporator at 75° C. under vacuum to obtain a dried sample which was calcined at 550° C. for 5 hours. The calcined sample was ground into fine powder, pressed into a pellet and sieved to collect the composition having varying loadings of rare earth metal salt on the zeolite.

The proportion of the components with respect to the other and the results of the use of the composition as a catalyst as per the process provided in Example 2 parameter 01 for converting olefins are provided in Table 3 given below.

EXAMPLE 2

The Conversion of Olefin Present in the Hydrocarbon Stream by Using the Composition of the Present Disclosure as a Catalyst The conversion of olefin was carried out using cracked naphtha as a hydrocarbon stream obtained from FCCU. The composition of the hydrocarbon stream is as given in table 1 given below:

TABLE 1

Composition of the cracked naphtha i.e., hydrocarbon stream

| Sr. No | Particulars | w/w % |
|---|---|---|
| 1 | Paraffins | 33.18 |
|   | Iso-Paraffins |  |
| 2 | Olefins | 12.19 |
| 3 | Cyclo Olefins | 3.14 |
| 4 | Naphthenes | 9.34 |
| 5 | Aromatics | 42.08 |

The conversion reaction was carried out in a fixed bed down-flow reactor unit with a high pressure liquid gas separator. The liquid products obtained are weighed using an integrated balance. The liquid products were analyzed by bromine number method (ASTM: D1159-07). The reaction parameters are provided in the table 2 below:

TABLE 2

Reaction parameters for the conversion of olefins by using the composition of the present disclosure

|  | Parameter-01 |
|---|---|
| Temperature (° C.) | 400 |
| Pressure | 1 atm |
| Carrier Gas | Nitrogen |
| Feed | cracked naphtha |
| Feed flow rate (ml/h) | 12 |
| WHSV ($h^{-1}$) | 9.12 |

TABLE 3

The proportion of the components with respect to the other and the results of the use of the composition as a catalyst as per the process provided in Example 2 parameter 01.

| No. | Rare Earth Metal | Diluent | Rare Earth Loading on Diluent | Zeolite | Rare Earth Loading (wt. %) on zeolite | Diluent: Zeolite Ratio | Results of the use of the composition as per Example 2 parameter-01 ||
|---|---|---|---|---|---|---|---|---|
|  |  |  |  |  |  |  | Olefin reduction w/w % | % Cracked gases |
| 1. | — | Pseudo-boehmite | — | — | — | — | 8.6 | 15 |
| 2. | La | Pseudo-boehmite | 5 | — | — | — | 8 | 6 |
| 3. | La | Pseudo-boehmite | 5 | ZSM-5 | 5 | 50:50 | 67.7 | 14 |
| 4. | La | Pseudo-boehmite | 5 | ZSM-5 | 5 | 60:40 | 51.9 | 13 |
| 5. | La | Pseudo-boehmite | 5 | ZSM-5 | 5 | 70:30 | 61.9 | 15 |
| 6. | La | Pseudo-boehmite | 5 | ZSM-5 | 5 | 80:20 | 50 | 14 |
| 7. | La | Pseudo-boehmite | 5 | ZSM-5 | 5 | 90:10 | 44 | 20 |
| 8. | La | Pseudo-boehmite | — | ZSM-5 | 5 | 60:40 | 57 | 20 |
| 9. | La | Pseudo-boehmite | — | ZSM-5 | 5 | 70:30 | 68 | 16 |
| 10. | La | Pseudo-boehmite | — | ZSM-5 | 5 | 80:20 | 60 | 20 |

TABLE 3-continued

The proportion of the components with respect to the other and the results of the use of the composition as a catalyst as per the process provided in Example 2 parameter 01.

| No. | Rare Earth Metal | Diluent | Rare Earth Loading on Diluent | Zeolite | Rare Earth Loading (wt. %) on zeolite | Diluent: Zeolite Ratio | Results of the use of the composition as per Example 2 parameter-01 | |
|---|---|---|---|---|---|---|---|---|
| 11. | La | Pseudo-boehmite | — | ZSM-5 | 5 | 90:10 | 53 | 15 |
| 12. | La | Pseudo-boehmite | 2.5 | ZSM-5 | 2.5 | 60:40 | 66 | 17 |

From the above results it is seen that the catalyst of the present invention satisfactorily reduces olefin.

EXAMPLE 3

Preparation of Extrudates 1.5 gm of ZSM-5 was mixed thoroughly with 3.5 gm of pseudoboehmite for 3 hours. 10 mL of 50% solution of concentrated nitric acid in water was added to the above mixture under stirring. The final material obtained was extruded into 2 mm extrudates. The extrudates were calcined to the desired temperature ranging from 550 to 750° C. ranging from 2 to 6 h.
Metal Loading on Extrudates:

The desired amount of Lanthanum nitrate, was dissolved in water to give solutions ranging 0.01 M to 10 M or higher. The stock solution was added to the calcined extrudates to achieve the desired metal loading form 0.1% to 10% or higher depending on the experiment. The solution was evaporated and the final material was calcined at temperature ranging from 550-750° C. for 4 hours.
Reaction Over Extrudates:
Metal Loaded was 5% Lanthanum.

Sample 1: Extrudates were prepared with 60% zeolite content and 40% diluent and calcined at 750° C. for 4 hours. 5% Lanthanum was loaded on the extrudates and subsequently calcined at 550° C. for 4 hours.

Sample 2: Same as for sample 1 except for the zeolite content was 70% and the diluent content was 30%

Sample 3: Same as for sample 2 except for the calcination is carried out at 550° C. for 4 hours throughout the preparation.

Sample 4: Same as for sample 1 except that the zeolite content was 40% and the diluent content was 60%.

Sample 5: Same as for sample 2 except that the zeolite content was 30% and the diluent content was 70%.

Olefin reduction reaction was carried out using these samples as catalysts. The results are provided in Table 4:

TABLE 4

The results of olefin reduction using samples 1 to 5

| Sample No. | % Lanthanum | Diluent to zeolite ratio | SiO2/Al2O3 ratio | % Olefin reduction | % Cracking |
|---|---|---|---|---|---|
| 1 | 5 | 40:60 | 30 | 48 | 21 |
| 2 | 5 | 30:70 | 30 | 69 | 16 |
| 3 | 5 | 30:70 | 30 | 59 | 16 |
| 4 | 5 | 60:40 | 30 | 78 | 26 |
| 5 | 5 | 70:30 | 30 | 68 | 15 |

Sample 6:
Pseudoboehmite was loaded with 5% lanthanum and calcined prior to and after metal impregnation, coded as sample 6a 5% lanthanum was loaded on ZSM-5 with SiO2/Al2O3 ratio of 30 calcined at 550° C. for 4 hours prior to and after metal impregnation, coded as sample 6b.

70% of sample 6a and 30% of sample 6b were mixed. The olefin reduction reaction was conducted using sample 6 as a catalyst.

Sample 7:
60% of Sample 6a and 40% of Sample 6b
The olefin reduction reaction was conducted using samples 6 and 7 as catalysts.

TABLE 5

The results of olefin reduction using samples 6 and 7

| Sample No. | % Lanthanum | Diluent: Zeolite ratio | Zeolite SiO2/Al2O3 ratio | % Olefin reduction | % Cracking |
|---|---|---|---|---|---|
| 6 | 5 | 70:30 | 30 | 52 | 22 |
| 7 | 5 | 60:40 | 30 | 65 | 24 |

Reactions were conducted over samples to study the effect of calcination temperature on zeolite stability. Both the metal loaded zeolite and diluent were calcined at 750° C. for 4 hours prior to metal loading and calcined at 550° C. for 4 hours after metal loading.

Samples 8-10: 60% diluent/inert and 40% zeolite

TABLE 6

The results of olefin reduction using samples 8-10

| No. | Diluent Content | Zeolite Content | Zeolite SiO2/Al2O3 ratio | % Olefin reduction | % Cracking |
|---|---|---|---|---|---|
| 8 | 60 | 40 | 30 | 50 | 13 |
| 9 | 60 | 40 | 280 | 55.9 | 18 |
| 10 | 60 | 40 | 408 | 35.5 | 16 |

From the above results it is observed that the catalyst of the present invention is amenable to industrial application and simultaneously provide satisfactory performance in terms of olefin reduction.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the disclosure to achieve one or more of the desired objects or results.

Any discussion of documents, acts, materials or the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

While considerable emphasis has been placed herein on the specific features of the preferred embodiment, it will be appreciated that many additional features can be added and that many changes can be made in the preferred embodiment without departing from the principles of the disclosure. These and other changes in the preferred embodiment of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. A process for reducing olefin content in a hydrocarbon stream-said process comprising the following steps;
   i. providing at least one hydrocarbon stream comprising olefins in an amount ranging from 0.01 to 70 w/w %, and
   ii. contacting said hydrocarbon stream with a catalyst composition comprising:
      at least one rare earth metal in the range of 0.1 to 20 w/w %,
      at least one zeolite
      at least one diluent, wherein a ratio of said zeolite to said at least one diluent ranges from 1:9 to 9:1,
      at a temperature of from about 350° C. up to about 450° C. and at a pressure of from about 1 bar up to about 20 bars in the presence of at least one carrier gas to obtain the hydrocarbon stream comprising at least 40 w/w % reduced olefin content.

2. The process as claimed in claim 1, wherein the method step of contacting is carried out in a fixed bed reactor at a flow rate of said hydrocarbon stream ranging from about 10 ml/h up to about 14 ml/h and the space velocity ranging from about 8 WHSV (weight hourly space velocity) up to about 10 WHSV.

3. The process as claimed in claim 1, wherein the hydrocarbon stream is at least one selected from the group consisting of gasoline, vacuum gas oil (VGO), light cycle oil (LCO), naphtha and $C_4$ to $C_{12}$ olefins and the carrier gas is at least one selected from the group consisting of nitrogen and hydrogen.

4. The process as claimed in claim 1, wherein said at least one rare earth metal is impregnated in said at least one zeolite.

5. The process as claimed in claim 1, wherein said at least one rare earth metal is incorporated in said at least one diluent.

6. The process as claimed in claim 1, wherein a ratio of $SiO_2$ to $Al_2O_3$ in said at least one zeolite ranges from about 1:20 up to about 1:450; and the ratio of said at least one zeolite to said at least one diluent ranges from about 1:1 up to about 7:3.

7. The process as claimed in claim 1, wherein the at least one rare earth metal is selected from the group consisting of scandium, yttrium, lanthanum, praseodymium, neodymium, promethium, samarium, europium, gadolinium, terbium, dysprosium, holmium, erbium, thulium, ytterbium and lutetium and said at least one rare earth metal is in a salt form selected from the group consisting of chloride, bromide, fluoride, iodide, sulfates, phosphates, phosphonates, nitrates, nitrites, carbonates, acetates, bicarbonates, hydroxides and oxides.

8. The process as claimed in claim 1, wherein the at least one zeolite is selected from the group consisting of ZSM-5, ZSM-11, ZSM-12, ZSM-22, ZSM-23, ZSM-48, ZSM-57, SAPO-5, SAPO-11, SAPO-17, SAPO-18, SAPO-34, SAPO-44, ferrierite, mordenite, beta and zeolite Y; and the at least one diluent is selected from the group consisting of pseudoboehmite, kaolin, alpha-alumina, gamma-alumina, theta-alumina, eta-alumina, kaolinite, mortmorillonite, and amberlite, preferably pseudoboehmite.

9. The process as claimed in claim 1, wherein the catalyst composition is in the form of extrudate, spherical, pellet, lobe, ring, granule or powder.

* * * * *